(12) United States Patent
Hoshino et al.

(10) Patent No.: US 11,345,045 B2
(45) Date of Patent: May 31, 2022

(54) ROBOT AND ROBOT SYSTEM

(71) Applicant: Seiko Epson Corporation, Tokyo (JP)

(72) Inventors: Shingo Hoshino, Hokuto (JP); Masaki Motoyoshi, Azumino (JP)

(73) Assignee: Seiko Epson Corporation

( * ) Notice: Subject to any disclaimer, the term of this patent is extended or adjusted under 35 U.S.C. 154(b) by 400 days.

(21) Appl. No.: 16/451,056

(22) Filed: Jun. 25, 2019

(65) Prior Publication Data
US 2019/0389077 A1    Dec. 26, 2019

(30) Foreign Application Priority Data

Jun. 26, 2018    (JP) .............................. JP2018-120883

(51) Int. Cl.
*G05B 15/00*    (2006.01)
*G05B 19/00*    (2006.01)
(Continued)

(52) U.S. Cl.
CPC ............ *B25J 13/088* (2013.01); *B25J 9/046* (2013.01); *B25J 18/00* (2013.01); *B25J 19/0025* (2013.01)

(58) Field of Classification Search
CPC ...... B25J 9/1694; B25J 9/1651; B25J 9/1633; B25J 13/088; B25J 9/1638; B25J 9/1641; B25J 13/085; B25J 18/00; B25J 9/1653; B25J 9/042; B25J 9/0087; B25J 9/1697; B25J 9/0009; B25J 9/044; B25J 9/1607; B25J 19/02; B25J 9/1635; B25J 13/06; B25J 17/02; B25J 18/04; B25J 19/0025; B25J 19/0029; B25J 9/0018; B25J 9/161; B25J 9/162; B25J 9/1664; B25J 17/00; B25J 18/005; B25J 18/02; B25J 19/0004; B25J 9/0027; B25J 9/046; B25J 9/06; B25J 15/0052; B25J 15/02; B25J 19/005; B25J 3/04; B25J 5/007; B25J 9/101; B25J 9/102; B25J 9/1602; B25J 9/1656; B25J 9/1682; B25J 9/1687; B25J 9/1692; B25J 17/0275; B25J 5/00; B25J 9/1612; B25J 9/1615; B25J 9/163; B25J 9/1666; B25J 9/1676;
(Continued)

(56) References Cited

U.S. PATENT DOCUMENTS

| | | | |
|---|---|---|---|
| 8,463,440 B2 | 6/2013 | Motoyoshi et al. | |
| 2009/0055019 A1* | 2/2009 | Stiehl ..................... | B25J 9/1656 700/249 |
| 2017/0008170 A1* | 1/2017 | Igarashi ................. | B25J 9/1641 |

FOREIGN PATENT DOCUMENTS

| | | | |
|---|---|---|---|
| CN | 108519081 A | * | 9/2018 |
| JP | 2010-284770 A | | 12/2010 |

(Continued)

*Primary Examiner* — Harry Y Oh
(74) *Attorney, Agent, or Firm* — Harness, Dickey & Pierce, P.L.C.

(57) ABSTRACT

A robot has a base, a first arm provided at the base and pivoting about a first axis relative to the base, a second arm provided at the first arm and pivoting about a second axis parallel to the first axis relative to the first arm, an inertial sensor provided in the second arm and detecting one or both of an angular velocity about an angular velocity detection axis orthogonal to an axial direction of the second axis and an acceleration in the second axis direction, a pipe located outside of the first arm and coupling the base and the second arm, and a wire placed through the pipe and electrically coupled to the inertial sensor.

8 Claims, 15 Drawing Sheets

(51) Int. Cl.
*B25J 13/08* (2006.01)
*B25J 9/04* (2006.01)
*B25J 18/00* (2006.01)
*B25J 19/00* (2006.01)

(58) Field of Classification Search
CPC .............. B25J 9/1674; Y10T 74/20329; Y10T 74/20305; Y10T 74/20335; Y10T 74/18792; Y10T 428/2991; B60K 6/26; B60K 6/48; B60K 1/00; B60K 11/02; B60K 17/043; B60K 17/22; B60K 17/356; B60K 2001/006; B60K 2006/4833; B60K 2007/0046; B60K 2007/0061; B60K 6/442; B60K 6/445; B60K 7/0007; B60Y 2200/92; B60Y 2400/307; B60Y 2200/91; B60Y 2410/102; F16H 25/08; F16H 2057/02034; F16H 2057/02043; F16H 3/091; F16H 57/021; F16H 59/14; G01L 3/102; G01L 5/221; G06T 1/0014; G06T 2207/30164; G06T 7/75; G11B 27/105; G11B 27/28; G11B 27/3081; G11B 27/34; H02K 11/24; H02K 11/21; H02K 21/14; H02K 7/003; H02K 7/006; H02K 7/083; H02K 9/19; H04N 21/23418; H04N 21/812; H04N 21/8456; Y02T 10/62; Y02T 10/70; Y02T 10/72; Y02W 30/62; Y02W 30/91; Y02P 70/50; A61K 31/525; A61K 9/2866; B29B 9/12; B29B 9/16; B29L 2031/772; C23C 2/06; C23C 2/40; C23C 22/18; C23C 22/76; H01L 41/125; C01B 33/20; C01B 33/32; B29K 2105/251; G06Q 10/00; G06Q 30/02; G06Q 30/0261; G06Q 30/0269; G06Q 30/0277; G06N 20/00; G06F 16/9535; H01M 4/131; H01M 4/1391; H01M 4/625; H01M 4/133; H01M 4/1393; H01M 4/364; H01M 10/052; H01M 4/0471; H01M 4/136; H01M 4/366; H01M 4/5825; H01M 10/0525; H01M 2004/028; H01M 4/0404; H01M 4/043; H01M 4/1397; H01M 4/505; H01M 4/525; H01M 4/587; G01P 21/02; G01P 3/44; G05B 2219/39195; G05B 2219/40597; G05B 2219/39335; G05B 2219/41128; G05B 2219/42104; G05B 2219/42225; G05B 2219/41193; G05B 2219/41195; G05B 2219/41205; G05B 2219/42077; G05B 2219/37134; G05B 2219/39322; G05B 2219/40558; G05B 15/00; G05B 19/404; G05B 19/423; G05B 2219/37388; G05B 2219/39178; G05B 2219/40549; G05B 2219/40582; G05B 2219/41025; G05B 19/231; G05B 19/251; G05B 19/291; G05B 19/311; G05B 19/39; G05B 19/40; G05B 2219/39024; G05B 2219/39045; G05B 2219/39109; G05B 2219/39318; G05B 2219/39321; G05B 2219/39325; G05B 2219/39329; G05B 2219/39332; G05B 2219/39343; G05B 2219/40301; G05B 2219/41021; G05B 2219/43203; G05B 19/418; G05B 19/41815; G05B 2219/31002; G05B 2219/31264; G05B 2219/32061; G05B 2219/36429; G05B 2219/36433; G05B 2219/36457; G05B 2219/36473; G05B 2219/39082; G05B 2219/39155; G05B 2219/39163; G05B 2219/39194; G05B 2219/39319; G05B 2219/39348; G05B 2219/39391; G05B 2219/39529; G05B 2219/40031; G05B 2219/40269; G05B 2219/40445; G05B 2219/40565; G05B 2219/40014; G05B 2219/40032; G05B 2219/40218; Y10S 901/09; Y10S 901/46; Y10S 901/02; Y10S 901/28; Y10S 901/27; Y10S 901/15; Y10S 901/11; Y10S 901/19; Y10S 901/30; Y10S 901/47; Y02E 60/10
See application file for complete search history.

(56) References Cited

FOREIGN PATENT DOCUMENTS

| | | | |
|---|---|---|---|
| JP | 2013111665 A | * | 6/2013 |
| JP | 2017-042836 A | | 3/2017 |
| JP | 2017-056542 A | | 3/2017 |

* cited by examiner

ROBOT AND ROBOT SYSTEM

The present application is based on, and claims priority from, JP Application Serial Number 2018-120883, filed Jun. 26, 2018, the disclosure of which is hereby incorporated by reference herein in its entirety.

BACKGROUND

1. Technical Field

The present disclosure relates to a robot and a robot system.

2. Related Art

A robot disclosed in JP-A-2017-42836 is a horizontal articulated robot (scalar robot), and has a base, a first arm pivotably coupled to the base about a first axis along vertical directions, a second arm pivotably coupled to the first arm about a second axis along the vertical directions, and a shaft attached to the second arm via a shaft support part. Further, the robot has a sensor provided in the first arm and detecting vibration of the first arm in the vertical directions, and can perform damping control to reduce vibration in the vertical directions based on a detection result of the sensor.

However, in the robot of JP-A-2017-42836, the sensor is provided in the first arm, and accordingly, there is a problem that accurate detection of vibration in the vertical directions in an attachment part of the shaft to the second arm is hard.

SUMMARY

A robot according to an application example of the present disclosure has a base, a first arm provided at the base and pivoting about a first axis relative to the base, a second arm provided at the first arm and pivoting about a second axis parallel to the first axis relative to the first arm, an inertial sensor provided in the second arm and detecting one or both of an angular velocity about an angular velocity detection axis orthogonal to an axial direction of the second axis and an acceleration in the second axis direction, a pipe located outside of the first arm and coupling the base and the second arm, and a wire placed through the pipe and electrically coupled to the inertial sensor.

DESCRIPTION OF EXEMPLARY EMBODIMENTS

As below, a robot and robot system according to the present disclosure will be explained in detail based on embodiments shown in the accompanying drawings.

First Embodiment

Figure 1:
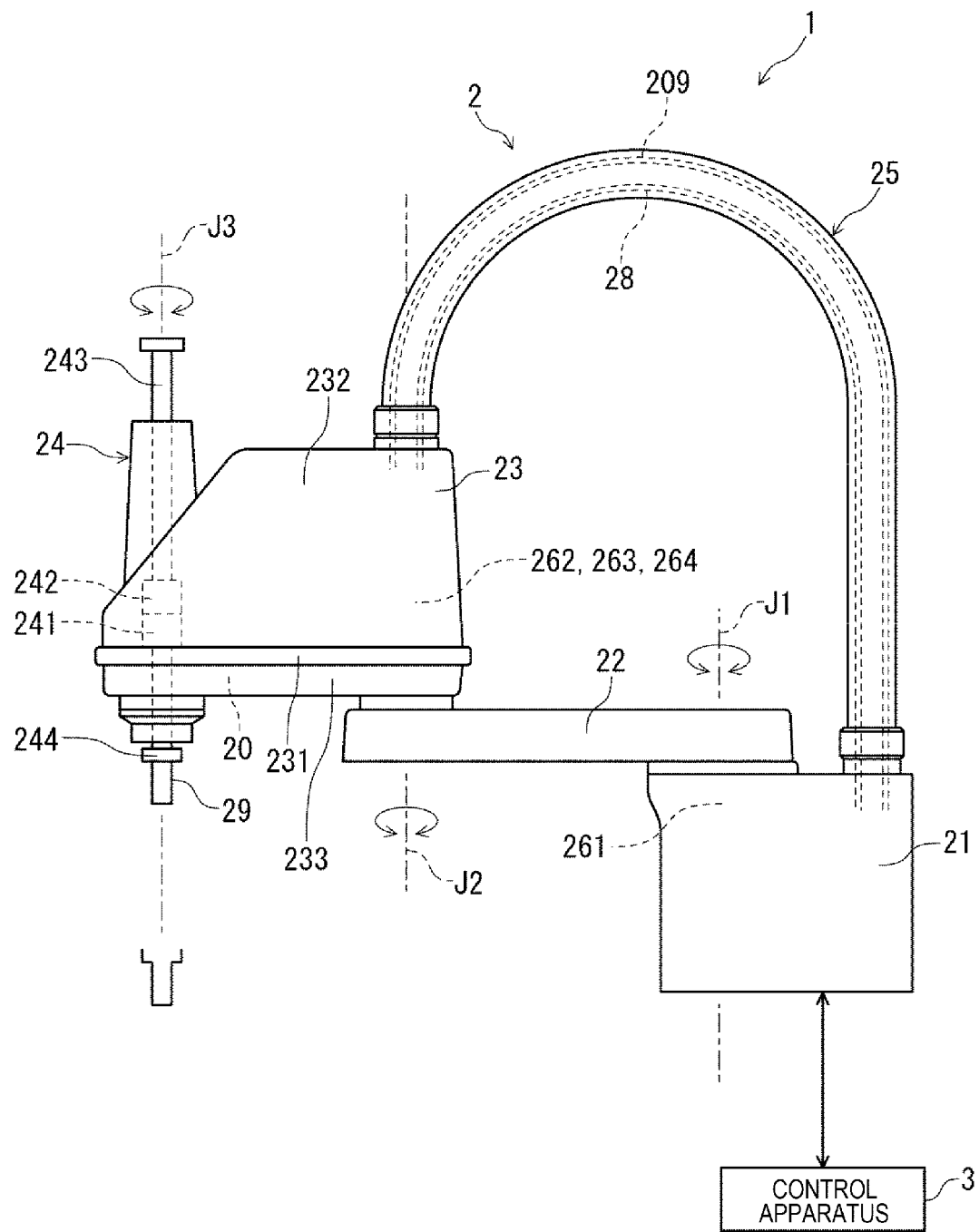
FIG. 1 shows an entire configuration of a robot system according to a first embodiment of the present disclosure.
Figure 2:
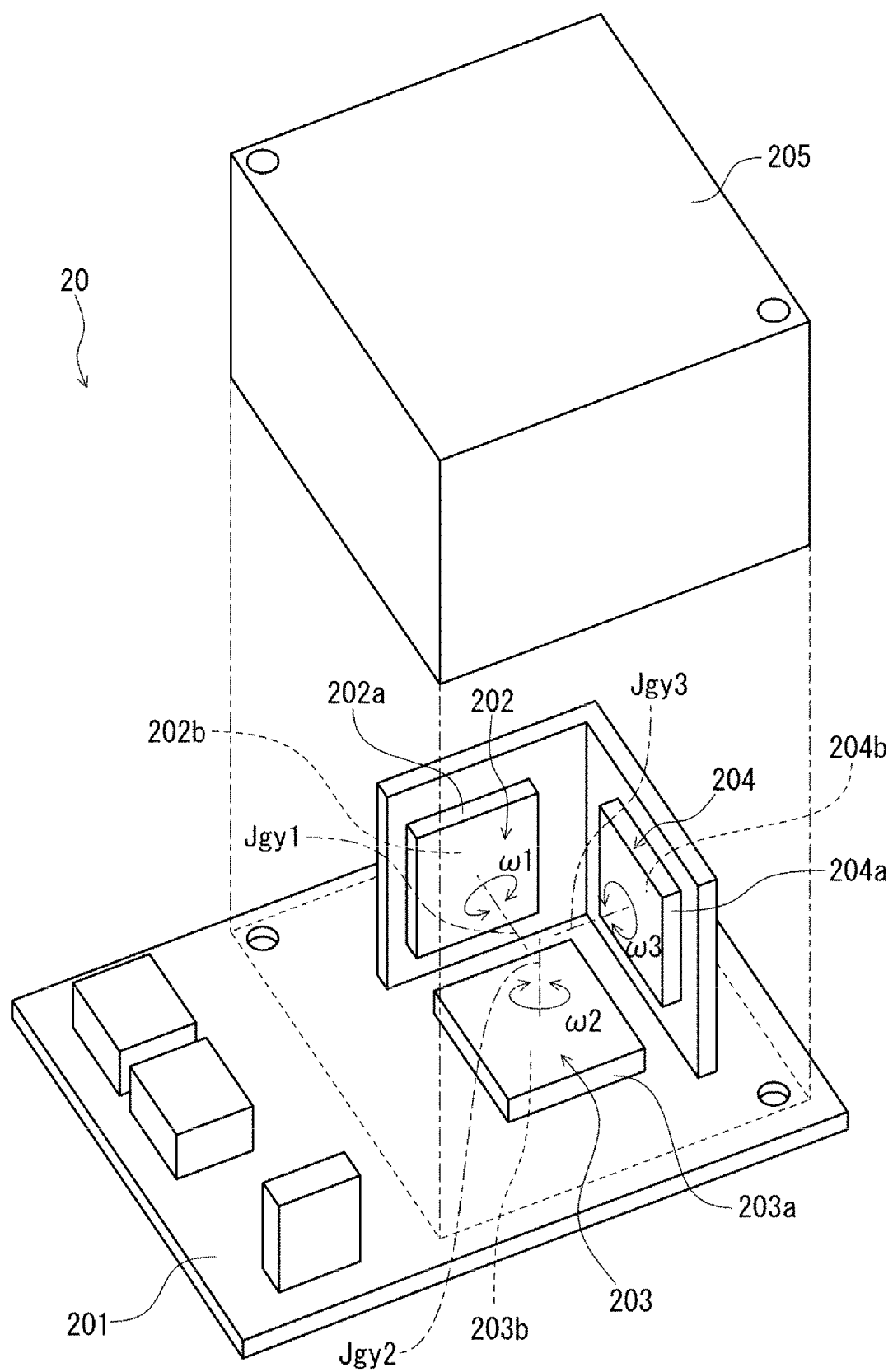
FIG. 2 is an exploded perspective view of an inertial sensor unit.
Figure 3:
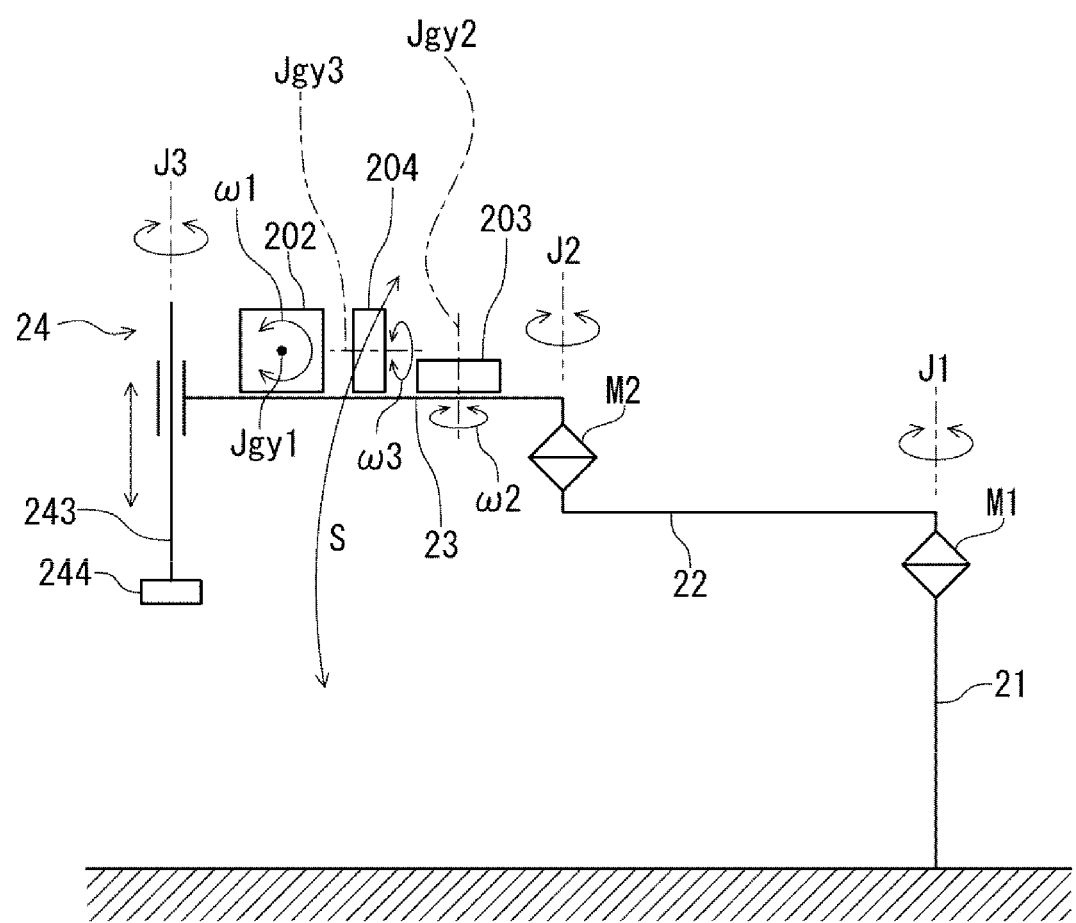
FIG. 3 is a schematic diagram of a robot.
Figure 4:
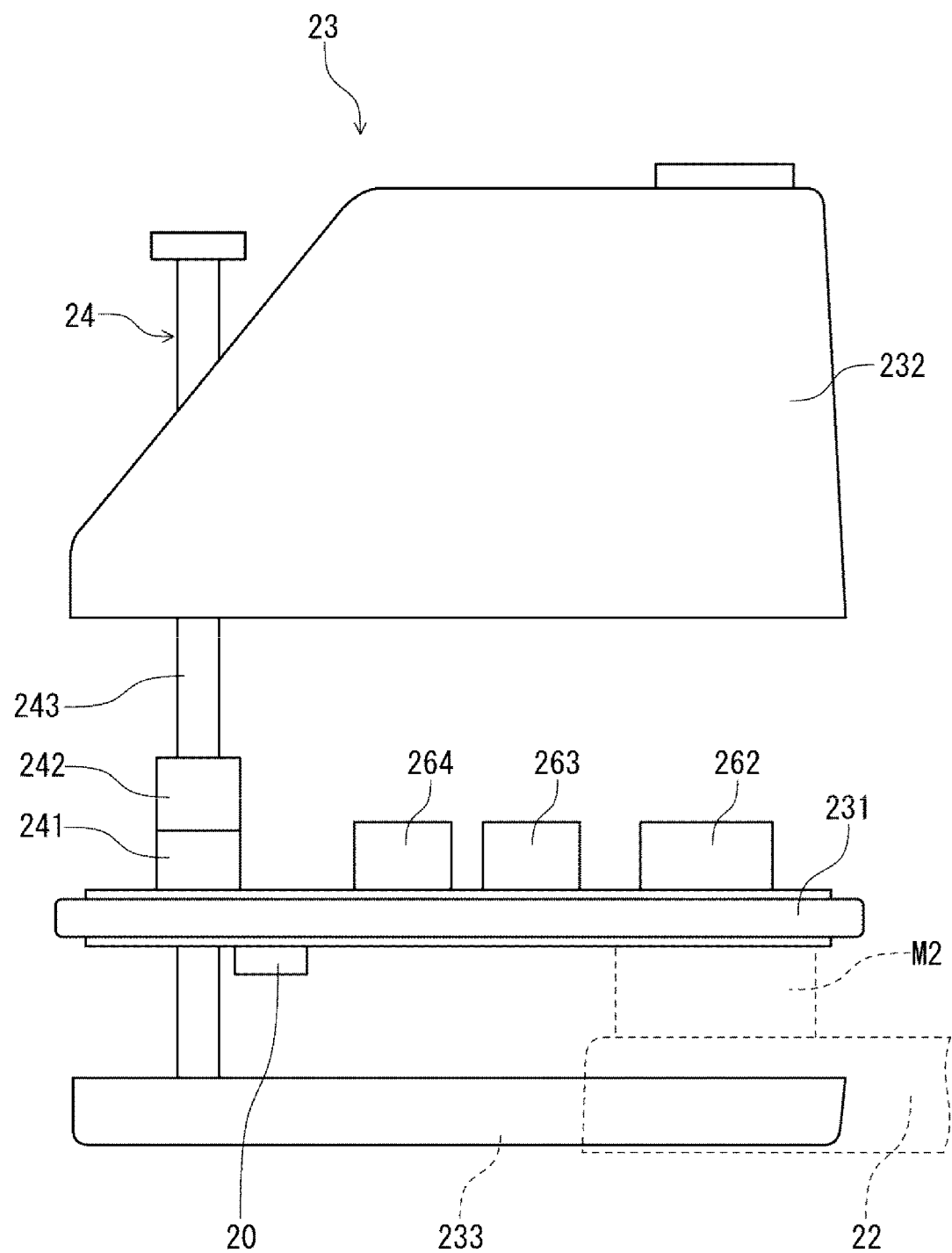
FIG. 4 is an exploded side view of a second arm.
Figure 5:
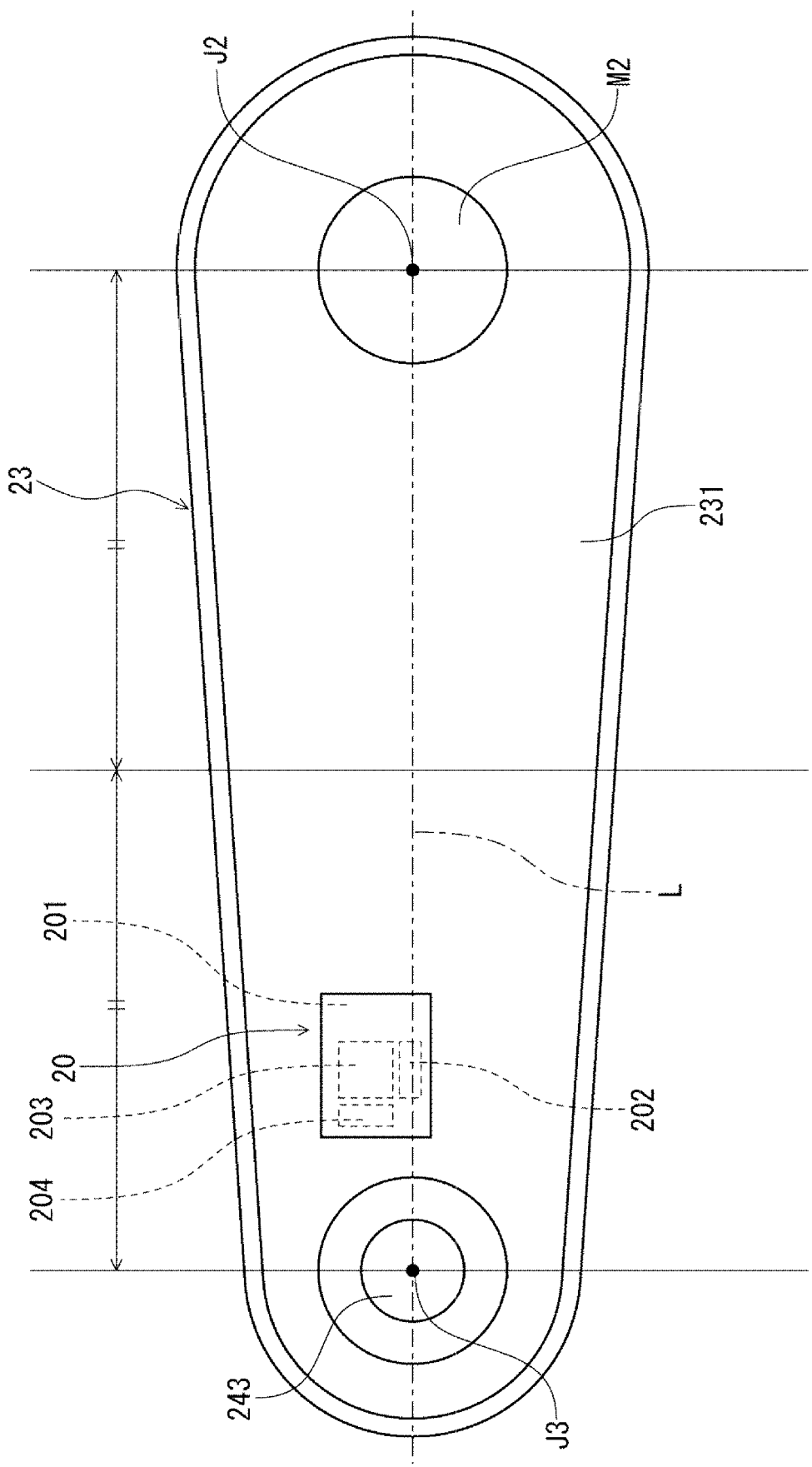
FIG. 5 is a bottom view of an arm base of the second arm.
Figure 6:
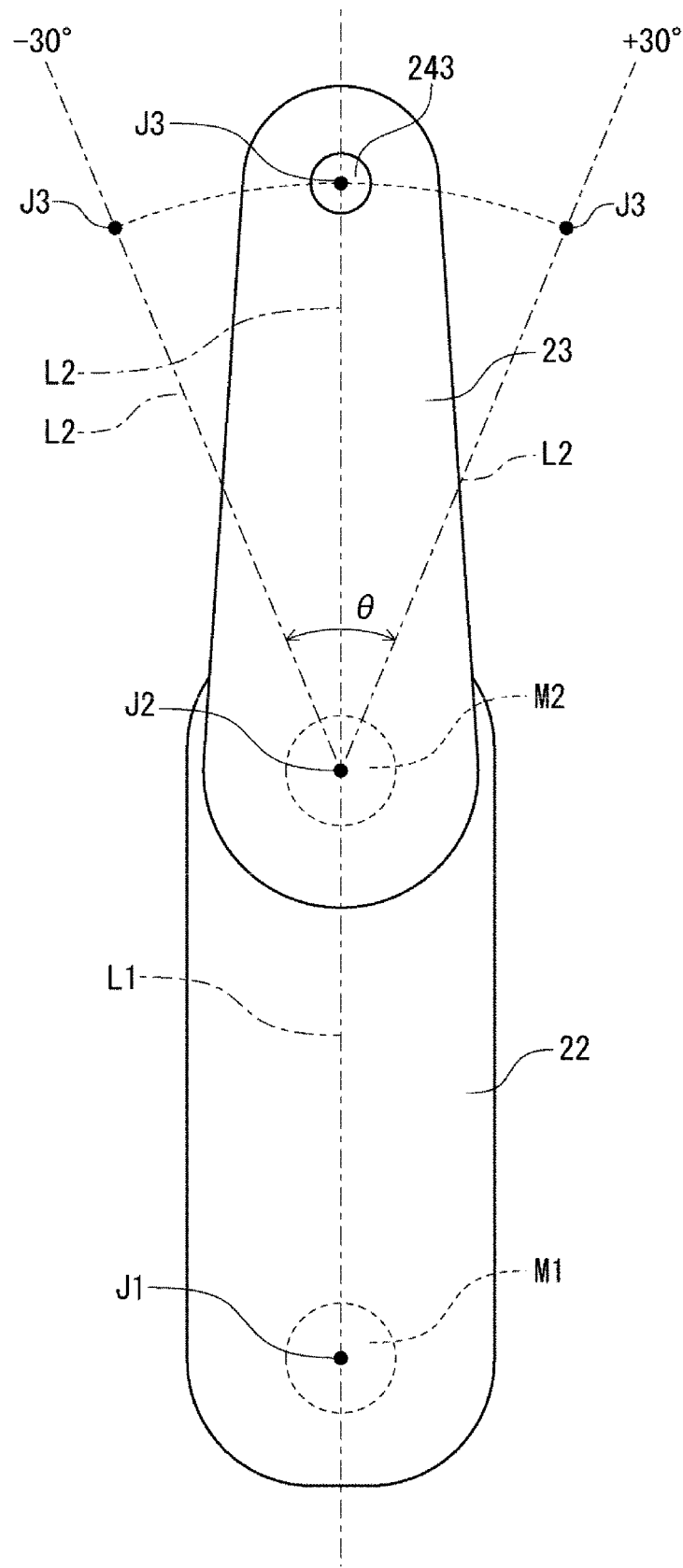
FIG. 6 is a top view showing a state in which the second arm extends relative to the first arm.
Figure 7:
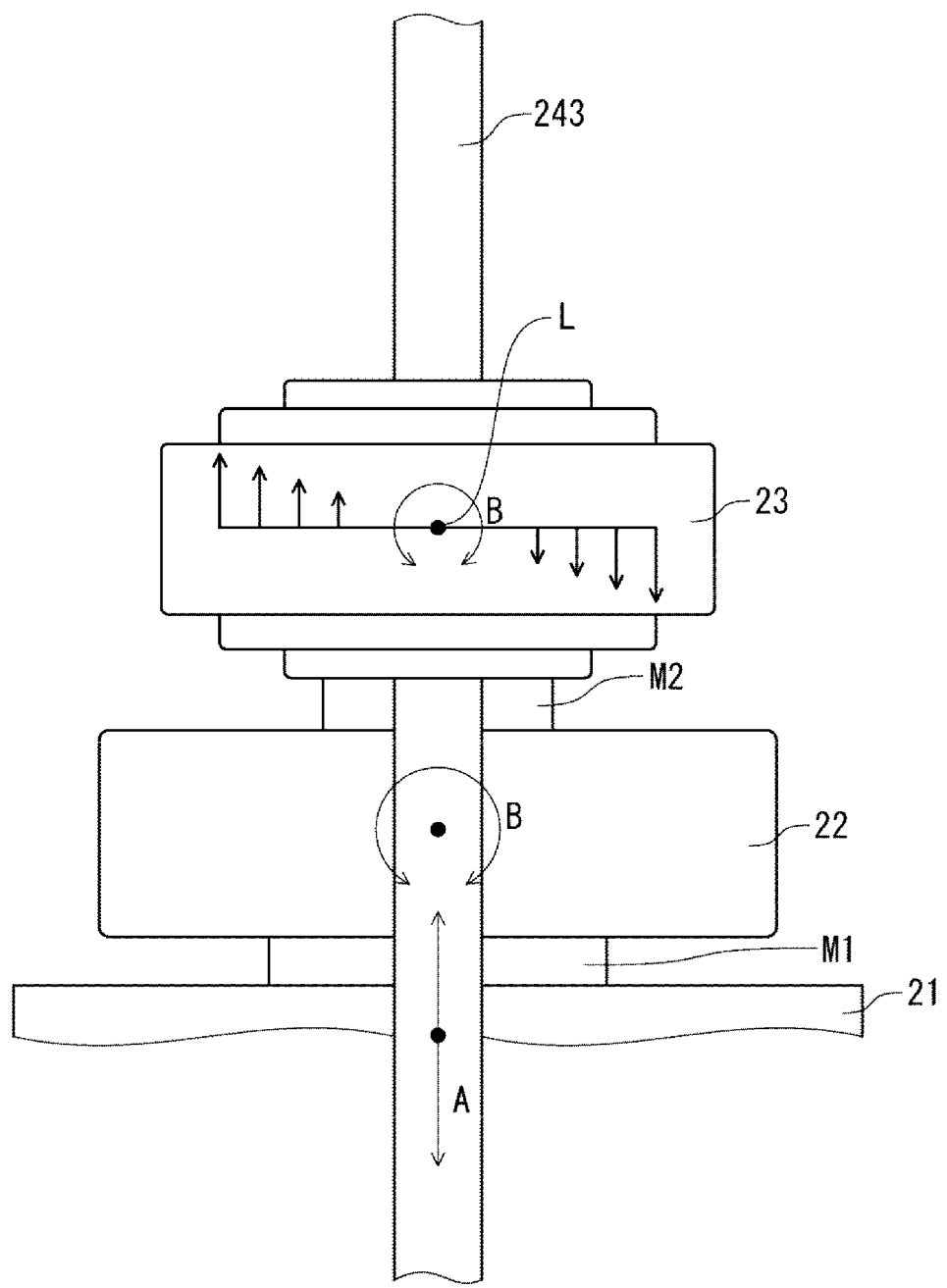
FIG. 7 is a front view showing vibration components contained in vibration of the second arm in vertical directions.
Figure 8:
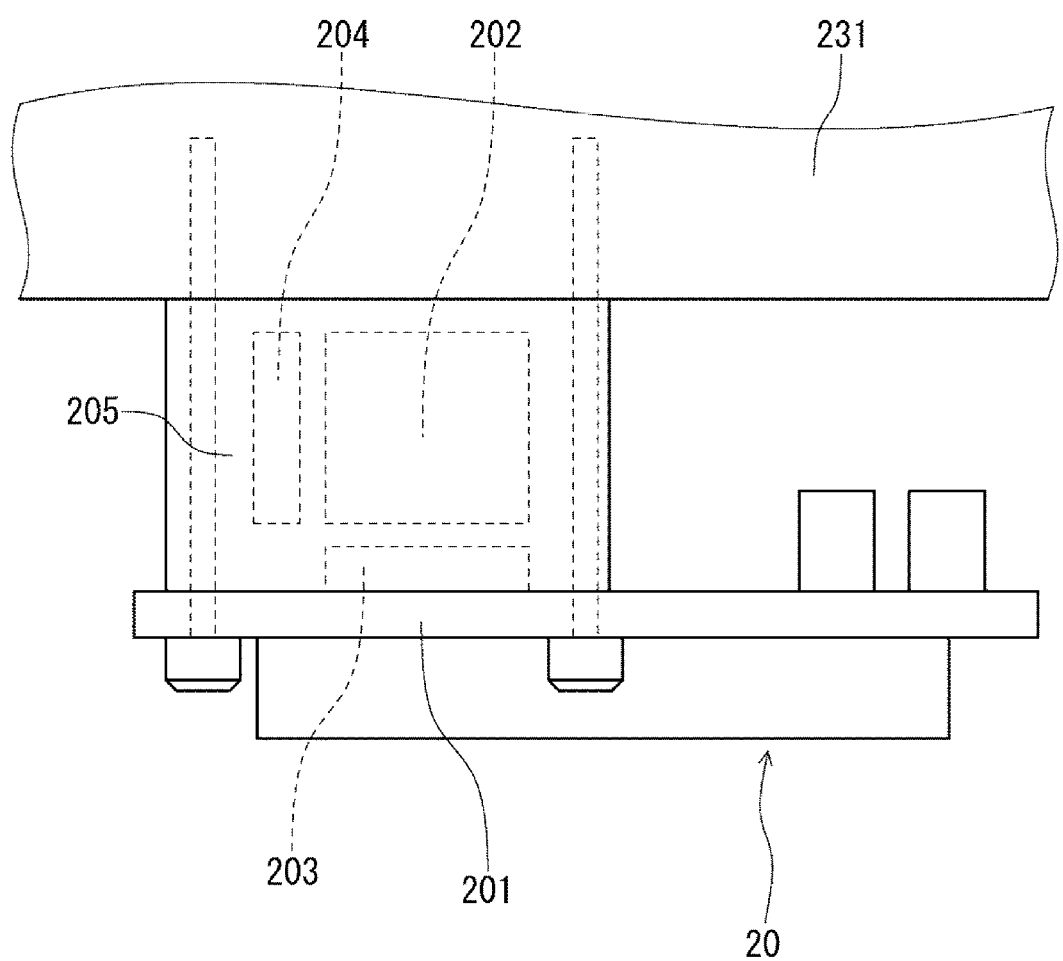
FIG. 8 is a side view showing a fastening condition of the inertial sensor unit and the arm base.
Figure 9:
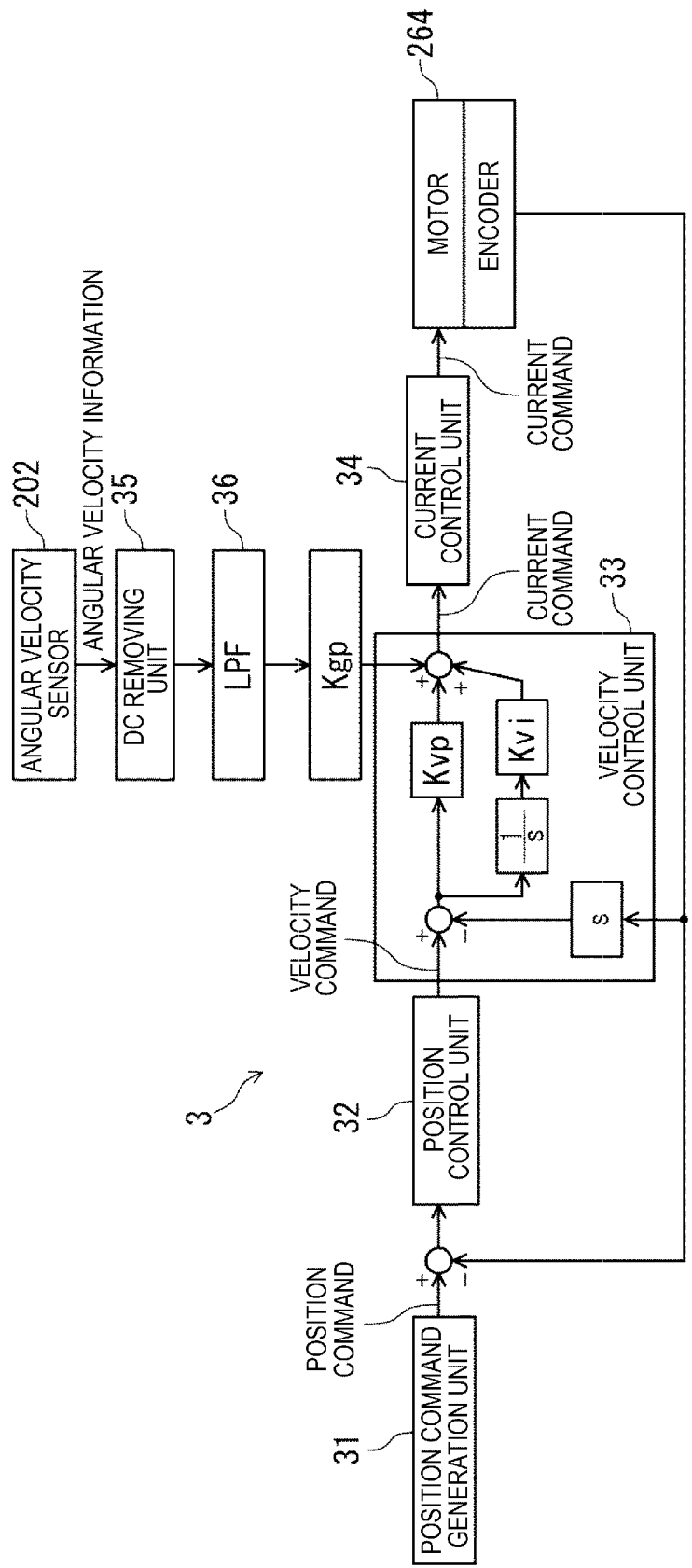
FIG. 9 is a block diagram showing a circuit system of a control apparatus.

FIG. 1 shows the entire configuration of the robot system according to the first embodiment of the present disclosure. FIG. 2 is the exploded perspective view of the inertial sensor unit. FIG. 3 is the schematic diagram of the robot. FIG. 4 is the exploded side view of the second arm. FIG. 5 is the bottom view of the arm base of the second arm. FIG. 6 is the top view showing the state in which the second arm extends relative to the first arm. FIG. 7 is the front view showing vibration components contained in vibration of the second arm in vertical directions. FIG. 8 is the side view showing the fastening condition of the inertial sensor unit and the arm base. FIG. 9 is the block diagram showing the circuit system of the control apparatus.

Note that FIG. 1 schematically shows an end effector. Hereinafter, for convenience of explanation, the upside in FIG. 1 is referred to as "upper" and the downside is referred to as "lower". Further, upward and downward directions in FIG. are the vertical directions. In the specification, "horizontal" includes not only the completely horizontal case but also the cases with inclinations within ±5° relative to horizontal. Similarly, in the specification, "vertical" includes not only the completely vertical case but also the cases with inclinations within ±5° relative to vertical. Further, in the specification, "parallel" includes not only the case where two lines (including axes) or surfaces are completely parallel to each other but also the cases with inclinations within ±5°. Furthermore, in the specification, "orthogonal" includes not only the case where two lines (including axes) or surfaces are completely orthogonal to each other but also the cases with inclinations within ±5°. For convenience of explanation, in FIG. 3, placement of the inertial sensor is different from that in the other drawings.

A robot system 1 shown in FIG. 1 has a robot 2, and a control apparatus 3 that controls the robot 2. The usage of the robot system 1 is not particularly limited, but the robot system 1 may be used in respective work including holding, carrying, assembly, inspection, etc. of works (objects) such as electronic components and electronic apparatuses. The robot 2 is a horizontal articulated robot (scalar robot), and has a base 21, a first arm 22 provided at the base 21 pivotably about a first axis J1 relative to the base 21, a second arm 23 provided at a distal end part of the first arm 22 pivotably about a second axis J2 parallel to the first axis J1 relative to the first arm 22, a workhead 24 provided at the second arm 23, an inertial sensor unit 20 provided in the second arm 23, and a pipe 25 coupling the base 21 and the second arm 23.

The base 21 is fixed to e.g. a floor surface (not shown) by bolts or the like. A motor 261 that allows the first arm 22 to pivot about the first axis J1 relative to the base 21 is provided within the base 21. Further, an encoder (not shown) that detects an amount of rotation of the motor 261 is provided in the motor 261, and thereby, a pivot angle of the first arm 22 relative to the base 21 may be detected using output from the encoder. A motor 262 that allows the second arm 23 to pivot about the second axis J2 relative to the first arm 22 is provided within the second arm 23. Further, an encoder (not shown) that detects an amount of rotation of the motor 262 is provided in the motor 262, and thereby, a pivot angle of the second arm 23 relative to the first arm 22 may be detected using output from the encoder.

The workhead 24 is provided at a distal end part of the second arm 23. The workhead 24 has a spline nut 241 and a ball screw nut 242 coaxially placed in the distal end part of the second arm 23, and a spline shaft 243 inserted through the spline nut 241 and the ball screw nut 242. The spline shaft 243 is rotatable relative to the second arm 23 about a third axis J3 as a center axis thereof and movable in directions along the third axis J3. Note that the third axis J3 is parallel to the first axis J1 and the second axis J2 and along the vertical directions.

A motor 263 that rotates the spline nut 241 to rotate the spline shaft 243 about the third axis J3 is provided within the second arm 23. Further, an encoder (not shown) that detects an amount of rotation of the motor 263 is provided in the motor 263, and an amount of rotation of the spline shaft 243 relative to the second arm 23 may be detected using output from the encoder. A motor 264 that rotates the ball screw nut 242 to move the spline shaft 243 in directions along the third axis J3 is provided within the second arm 23. Further, an encoder (not shown) that detects an amount of rotation of the motor 264 is provided in the motor 264, and an amount of movement of the spline shaft 243 relative to the second arm 23 may be detected using output from the encoder.

A payload 244 for attachment of an end effector 29 is provided at a distal end part of the spline shaft 243. The end effector 29 attached to the payload 244 is not particularly limited to, but includes e.g. a hand that holds (grips, suctions) an object and a work tool that works the object.

The inertial sensor unit 20 is provided in the second arm 23. Particularly, in the embodiment, the inertial sensor unit 20 is provided in the distal end part of the second arm 23 near an attachment part of the spline shaft 243 to the second arm 23. Thereby, vibration of the second arm 23 in the vertical directions in the attachment part may be accurately detected.

As shown in FIG. 2, the inertial sensor unit 20 has three angular velocity sensors 202, 203, 204 as inertial sensors, and a circuit board 201 on which the angular velocity sensors 202, 203, 204 are mounted for processing signals output from the angular velocity sensors 202, 203, 204. The angular velocity sensors 202, 203, 204 have angular velocity detection axes orthogonal to one another. Specifically, as shown in FIG. 3, the angular velocity sensor 202 (first inertial sensor) has an angular velocity detection axis Jgy1 orthogonal to a plane passing through the second axis J2 and the third axis J3, and detects an angular velocity $\omega 1$ about the angular velocity detection axis Jgy1. Further, the angular velocity sensor 203 (second inertial sensor) has an angular velocity detection axis Jgy2 parallel to the second axis J2, and detects an angular velocity $\omega 2$ about the angular velocity detection axis Jgy2. Furthermore, the angular velocity sensor 204 has an angular velocity detection axis Jgy3 orthogonal to the angular velocity detection axis Jgy1 and the angular velocity detection axis Jgy2, and detects an angular velocity $\omega 3$ about the angular velocity detection axis Jgy3.

As shown in FIG. 3, the angular velocity sensor 202 detects an angular velocity of rotational motion of the second arm 23 mainly generated by a deflection of a joint M1 coupling the base 21 and the first arm 22, a deflection of a joint M2 coupling the first arm 22 and the second arm 23, bending and twisting of the first arm 22, and bending and twisting of the second arm 23. The second arm 23 is cantilevered by the first arm 22 and the first arm 22 is cantilevered by the base 21, and thus, the distal end part of the second arm 23, i.e., the attachment part of the spline shaft 243 to the second arm 23 makes rotational motion as shown by an arrow S relative to the base 21. Accordingly, the angular velocity equal to the vibration in the vertical directions in the attachment part of the spline shaft 243 to the second arm 23 may be detected by the angular velocity sensor 202.

The angular velocity sensor 203 detects an angular velocity of the second arm 23 in a pivot direction. Thereby, the vibration of the second arm 23 about the second axis J2 when the arm is driven may be detected. Note that, as described above, the angular velocity sensor 204 is further provided in the inertial sensor unit 20, however, in the embodiment, the detection signal from the angular velocity sensor 204 is not used for control of the robot 2. Accordingly, the angular velocity sensor 204 may be omitted. Alternatively, the detection signal from the angular velocity sensor 204 may be used for control of the robot 2.

Each of the configurations of the angular velocity sensors 202, 203, 204 is not particularly limited. As shown in FIG. 2, in the embodiment, the angular velocity sensors 202, 203, 204 have packages 202a, 203a, 204a, and sensor elements 202b, 203b, 204b housed in the packages 202a, 203a, 204a.

Each of the sensor elements 202b, 203b, 204b is not particularly limited. For example, crystal quartz vibrators may be used as the sensor elements 202b, 203b, 204b. In this case, when a vibrating arm of the crystal quartz vibrator is vibrated in a drive vibration mode and an angular velocity about the detection axis is applied in the state, a Coriolis force is generated and a detection vibration mode is newly excited in a detection arm. Accordingly, the angular velocity may be detected based on a detection signal generated in the detection vibration mode.

Or, silicon vibrators may be used as the sensor elements 202b, 203b, 204b. In this case, a movable unit is formed at a silicon substrate and a detection electrode is placed to face the movable unit. When the movable unit is vibrated in a drive vibration mode and an angular velocity about the detection axis is applied in the state, a Coriolis force is generated and a detection vibration mode is newly excited in the movable unit. A gap between the movable unit and the detection electrode changes in the detection vibration mode, and capacitance therebetween changes. Accordingly, the angular velocity may be detected based on the change in capacitance.

Note that, as described above, in the embodiment, the angular velocity sensor 202 detecting the angular velocity $\omega 1$, the angular velocity sensor 203 detecting the angular velocity $\omega 2$, and the angular velocity sensor 204 detecting the angular velocity $\omega 3$ are separately formed, however, at least two of the sensors may be integrally formed. In this case, a sensor element detecting the angular velocity ω1, a sensor element detecting the angular velocity ω2, a sensor element detecting the angular velocity ω3 may be housed within a single package, or a single sensor element can detect at least two of the angular velocities ω1, ω2, ω3.

On the circuit board 201, various circuit elements are placed and, as appropriate, drive circuits for driving the angular velocity sensors 202, 203, 204, detection circuits for detecting the angular velocities ω1, ω2, ω3 based on output from the angular velocity sensors 202, 203, 204, a temperature compensation circuit, etc. are formed. Further, the circuit board 201 has a lid member 205 covering the angular velocity sensors 202, 203, 204. The angular velocity sensors 202, 203, 204 may be protected by the lid member 205.

In the robot system 1, the angular velocity ω1 detected by the angular velocity sensor 202 is fed back to drive control of the motor 264, and thereby, the vibration in the vertical directions in the attachment part of the spline shaft 243 to the second arm 23 is reduced using a reaction force of the drive force for moving the spline shaft 243 up and down. That is, the spline shaft 243 is moved up and down, and thereby, an acceleration in the opposite direction to the vertical vibration is applied to the second arm 23 and the vibration in the vertical directions in the attachment part of the spline shaft 243 to the second arm 23 is reduced. Therefore, vibration of the robot 2 in the vertical directions may be effectively reduced. Further, in the robot system. 1, the angular velocity ω2 detected by the angular velocity sensor 203 is fed back to drive control of the motors 261, 262, and thereby, vibration of the second arm 23 in the pivot directions is reduced. Therefore, the vibration of the second arm 23 in the pivot directions may be effectively reduced.

As shown in FIG. 1, the pipe 25 directly couples the base 21 and the second arm 23 without passing through the first arm 22. Inside of the pipe 25, a wire insertion hole coupling inner parts of the base 21 and the second arm 23 is formed. At least a part of the pipe 25 has flexibility and the pivot of the first arm 22 relative to the base 21 and the pivot of the second arm 23 relative to the first arm 22 are allowed by deformation of the pipe 25. In the pipe 25, a wire 209 electrically coupled to the inertial sensor unit 20 is routed. In this case, the wire 209 inserted through the pipe 25 is not in the entire length, but at least in part.

In addition, in the pipe 25, a group of wires 28 having a plurality of wires electrically coupled to electronic components provided within the second arm 23, e.g., the motors 262 to 264, the encoders, etc. are routed. Thereby, the wires of the various electronic components provided within the second arm 23 may be directly routed to the base 21 without passing through the joint M2, the first arm 22, or the joint M1. Accordingly, wire routing is easier and various electronic components are easily provided within the second arm 23. Further, particularly, it is not necessary to secure a space for routing the wires to the joints M1, M2, and thereby, mechanical strengths of the joints M1, M2 may be improved without change in size, and the joints M1, M2 may be downsized without change in strength.

Note that the shape of the pipe 25 is not limited to the shape closed as a pipe line, but may be partially open, e.g. a shape having a C-shaped section.

As above, the configuration of the robot 2 is briefly explained. Next, the placement of the inertial sensor unit 20 will be explained in detail. As shown in FIG. 4, the second arm 23 has an arm base 231 coupled to the first arm 22 via the joint M2, an upper cover 232 that covers above the arm base 231, and a lower cover 233 that covers below the arm base 231. The above described spline nut 241, ball screw nut 242, motors 262, 263, 264, encoders, etc. are supported by the arm base 231 at the upside of the arm base 231 and covered by the upper cover 232. On the other hand, the inertial sensor unit 20 is supported by the arm base 231 at the downside of the arm base 231 and covered by the lower cover 233.

As shown in FIG. 5, the angular velocity sensor 202 contained in the inertial sensor unit 20 is provided closer to the third axis J3 side than the second axis J2. That is, the separation distance between the third axis J3 and the angular velocity sensor 202 is shorter than the separation distance between the second axis J2 and the angular velocity sensor 202. Thereby, the angular velocity sensor 202 may be placed near the third axis J3, and the vibration of the second arm 23 in the vertical directions in the attachment part of the spline shaft 243 to the arm base 231 may be detected by the angular velocity sensor 202 more accurately. Particularly, in the embodiment, as described above, the spline nut 241 and the ball screw nut 242 are placed at the upside of the arm base 231 and the inertial sensor unit 20 is placed at the downside of the arm base 231. Accordingly, the inertial sensor unit 20 may be placed near the third axis J3 without being hindered by the spline nut 241 or ball screw nut 242. Therefore, the vibration of the second arm 23 in the vertical directions in the attachment part of the spline shaft 243 to the arm base 231 may be detected by the angular velocity sensor 202 even more accurately.

Further, as shown in FIG. 5, the circuit board 201 is provided on a line L passing through the second axis J2 and the third axis J3 in the plan view from the axial direction of the third axis J3. Note that "the circuit board 201 is provided on the line L" means that the circuit board 201 has a portion overlapping with the line L in the plan view from the axial direction of the third axis J3. The inertial sensor unit 20 is placed as described above, and thereby, as shown in FIG. 6, the vibration of the second arm 23 in the vertical directions in the state in which the second arm 23 extends relative to the first arm 22 may be accurately detected.

Specifically, as shown in FIG. 7, vibration components in the vertical directions include a vibration component A generated mainly by the deflection of the joint M1, the bending of the first arm 22, the deflection of the joint M2, and the bending of the second arm 23, and a vibration component B generated mainly by the twisting of the first arm 22 and the twisting of the second arm 23. The vibration component B is larger in a portion farther from the line L in the plan view. The attachment part of the spline shaft 243 to the second arm 23 is on the line L and, in the state in which the second arm 23 extends relative to the first arm 22, the vibration component B is substantially not generated in the part. Accordingly, in the state in which the second arm 23 extends relative to the first arm 22, it is preferable that substantially only the vibration component A is used as the vibration component of the second arm 23 in the vertical directions.

In this regard, the circuit board 201 is placed on the line Las described above, and thereby, the angular velocity sensor 202 may be placed near the line L, preferably on the line L. Accordingly, the vibration component B applied to the angular velocity sensor 202 is smaller and insensitivity of the angular velocity sensor 202 to the vibration component B is higher. Therefore, substantially only the vibration component A may be accurately detected by the angular velocity sensor 202. Thus, the vibration of the second arm 23 in the vertical directions may be accurately detected.

Particularly, in the embodiment, the angular velocity sensor 202 is provided on the line L in the plan view from the axial direction of the third axis J3 (see FIG. 5). Thereby, noise due to the vibration component B is harder to be superimposed on the output from the angular velocity sensor 202, and the vibration component A may be detected by the angular velocity sensor 202 more accurately. Accordingly, the vibration of the second arm 23 in the vertical directions may be detected more accurately. Note that "the angular velocity sensor 202 is provided on the line L" means that the package 202a of the angular velocity sensor 202 has a portion overlapping with the line L in the plan view from the axial direction of the third axis J3, and the sensor element 202b preferably has a portion overlapping with the line L. Further, the state in which the second arm 23 extends relative to the first arm 22 refers to e.g. a state in which an inclination θ of a line L2 passing through the second axis J2 and the third axis J3 relative to a line L1 passing through the first axis J1 and the second axis J2 is from −30° to +30° as shown in FIG. 6.

Further, as shown in FIG. 8, the circuit board 201 is directly fixed to the arm base 231 of the second arm 23. Thereby, for example, compared to the case where the circuit board 201 is fixed to the arm base 231 via a support extending from the arm base 231, wobble of the circuit board 201 relative to the arm base 231 and mechanical resonance with the arm base 231 may be effectively suppressed. Accordingly, the vibration of the second arm 23 in the vertical directions may be accurately detected by the angular velocity sensor 202 mounted on the circuit board 201. Note that, in the embodiment, the circuit board 201 is fastened to the arm base 231 by screws, however, the fixing method is not particularly limited, but the circuit board 201 may be fixed to the arm base 231 using e.g. an adhesive. In the embodiment, the lid member 205 and the arm base 231 are in contact, however, the placement is not limited to that. "The circuit board 201 is directly fixed to the arm base 231" includes the case where a heat dissipation member or insulating member intervenes between the arm base 231 and the circuit board 201.

The control apparatus 3 is electrically coupled to the robot 2 and controls driving of the robot 2. The robot 2 and the control apparatus 3 are electrically coupled by a cable. Note that the coupling of the robot 2 and the control apparatus 3 is not limited to the wired system, but may be a wireless system without the cable, for example. Further, part or all of the control apparatus 3 may be provided in the robot 2.

The control apparatus 3 may include e.g. a computer (PC) with a CPU (Central Processing Unit) as an example of a processor built therein or the like. The control apparatus 3 may control each part of the robot 2. Particularly, the control apparatus 3 may feed back acceleration information (information of the angular velocity ω1) obtained from the angular velocity sensor 202 to a current command of the motor 264. Thereby, the vibration of the second arm 23 in the vertical directions in the attachment part of the spline shaft 243 to the second arm 23 may be reduced. Further, the control apparatus 3 may feed back information of the angular velocity ω2 obtained from the angular velocity sensor 203 to current commands of the motors 261, 262. Thereby, the vibration of the second arm 23 in the pivot directions may be reduced. Therefore, the robot system 1 having an excellent damping property is obtained.

As below, a method of feeding back the angular velocity information obtained from the angular velocity sensor 202 to the current command of the motor 264 will be briefly explained based on FIG. 9. As shown in FIG. 9, the control apparatus 3 has a position command generation unit 31 that generates a position command to the motor 264, a position control unit 32 that generates a velocity command to the motor 264 based on the position command generated in the position command generation unit 31, a velocity control unit 33 that generates the current command for driving the motor 264 based on the velocity command generated in the position control unit 32, and a current control unit 34 that supplies a current according to the current command from the velocity control unit 33 to the motor 264.

The position command generation unit 31 generates and outputs the position command as a target position of the spline shaft 243 based on details of processing performed by the robot 2. The position control unit 32 generates the velocity command based on a difference between the input position command and a current position detected by the encoder coupled to the motor 264. The velocity control unit 33 differentiates the velocity command and the current position detected by the encoder, performs proportional control to adjust proportional gain Kvp relative to deviation from an actual velocity and integral control to adjust integral gain Kvi, and generates the current command to set the velocity based on the velocity command. The current control unit 34 performs proportional control and integral control on the difference between the current command and an actual drive current, and supplies a current according to the current command to the motor 264. By the feedback control, the motor 264 is in a drive condition according to the position command and the velocity command.

The control apparatus 3 further has a DC removing unit 35 provided at the output side of the angular velocity sensor 202. The DC removing unit 35 removes an offset component (a signal component without being subjected to any angular velocity) from the angular velocity information output from the angular velocity sensor 202. The offset component contained in the angular velocity information may be obtained from e.g. moving average of the angular velocity while the robot 2 is stopped or the like. The DC removing unit 35 is provided, and thereby, excessive offset existing in the angular velocity information may be addressed. Further, the control apparatus 3 has an LPF 36 (lowpass filter) that removes a detuning noise component and a mechanical resonance component of the angular velocity sensor 202 from the angular velocity information. The LPF 36 is provided, and thereby, more accurate angular velocity information is obtained.

Further, the control apparatus 3 performs proportional control to adjust feedback gain Kgp (proportional gain) relative to the angular velocity information output from the LPF 36. Then, the adjusted angular velocity information is directly input to the current command. In this manner, the angular velocity information is fed back to the current command, and thereby, a reaction force to reduce (cancel) the vibration of the second arm 23 in the vertical directions may be directly controlled and capability to reduce the vibration in the vertical directions may be enhanced. Even when the angular velocity information contains offset, the influence thereby is cancelled in the integral processing by the velocity control unit 33, and the spline shaft 243 is harder to be displaced.

As above, the robot system 1 is explained. As described above, the robot 2 of the robot system 1 has the base 21, the first arm 22 provided at the base 21 and pivoting about the first axis J1 relative to the base 21, the second arm 23 provided at the first arm 22 and pivoting about the second axis J2 parallel to the first axis J1 relative to the first arm 22, the angular velocity sensor 202 as the inertial sensor provided in the second arm 23 and detecting the angular velocity ω1 about the angular velocity detection axis Jgy1 orthogonal to the axial direction of the second axis J2, the pipe 25 located outside of the first arm 22 and coupling the base 21 and the second arm 23, and the wire 209 placed through the pipe 25 and electrically coupled to the angular velocity sensor 202. The angular velocity sensor 202 is placed in the second arm 23 as described above, and thereby, the vibration of the second arm 23 in the vertical directions may be accurately detected. Accordingly, the detection signal from the angular velocity sensor 202 is fed back to driving of the robot 2, and thereby, the vibration of the second arm 23 in the vertical directions may be effectively suppressed. Particularly, the wire 209 is placed within the pipe 25, and thereby, the wire 209 may be directly routed to the base 21 not via the joint M2, the first arm 22, or the joint M1. Accordingly, the wire 209 is easily routed and the angular velocity sensor 202 is easily provided within the second arm 23. Further, it is not necessary to secure a space for routing the wires to the joints M1, M2, and thereby, mechanical strengths of the joints M1, M2 may be improved without change in size, and the joints M1, M2 may be downsized without change in strength.

As described above, the robot 2 includes the spline shaft 243 (shaft) provided at the second arm 23 and being pivotable about the third axis J3 parallel to the second axis J2, and the circuit board 201 on which the angular velocity sensor 202 is mounted for processing signals output from the angular velocity sensor 202. The circuit board 201 crosses the plane passing through the second axis J2 and the third axis J3. Thereby, the vibration component B in the vertical directions due to the twisting of the first arm 22 and the second arm 23 is harder to be detected by the angular velocity sensor 202. Therefore, particularly, the vibration of the second arm 23 in the vertical directions in the state in which the second arm 23 extends relative to the first arm 22 may be accurately detected. Especially, in the embodiment, the angular velocity sensor 202 is provided on the line L as seen from the axial direction of the third axis J3. Accordingly, the above described effect may be exerted more remarkably.

As described above, the angular velocity sensor 202 is provided closer to the third axis J3 side than the second axis J2. Thereby, the vibration of the second arm 23 in the vertical directions in the attachment part of the spline shaft 243 to the second arm 23 may be detected more accurately. Accordingly, the vibration of the spline shaft 243 in the vertical directions may be reduced more effectively and the robot system 1 that may perform more stable driving is obtained.

As described above, the circuit board 201 is directly fixed to the arm base 231 of the second arm 23. Thereby, for example, compared to the case where the circuit board 201 is fixed to the arm base 231 via a support extending from the arm base 231, wobble of the circuit board 201 relative to the arm base 231 and mechanical resonance with the arm base 231 may be effectively suppressed. Accordingly, the vibration of the second arm 23 in the vertical directions may be accurately detected by the angular velocity sensor 202 mounted on the circuit board 201.

As described above, the inertial sensor is the angular velocity sensor 202 that detects the angular velocity $\omega 1$ about the angular velocity detection axis Jgy1 orthogonal to the second axis J2 direction. Thereby, the vibration of the second arm 23 in the vertical directions may be accurately detected.

As described above, the inertial sensor may detect the angular velocity $\omega 2$ of the second arm 23 in the pivot direction, i.e., the angular velocity $\omega 2$ about the second axis J2. Accordingly, the angular velocity $\omega 2$ is fed back to the driving of the robot 2, and thereby, the vibration of the second arm 23 in the pivot directions may be effectively suppressed. Particularly, the robot 2 of the embodiment includes the angular velocity sensor 202 as the first inertial sensor that detects the angular velocity $\omega 1$ about the angular velocity detection axis Jgy1 orthogonal to the second axis J2 direction and the angular velocity sensor 203 as the second inertial sensor that detects the angular velocity $\omega 2$ in the pivot direction of the second arm 23, as the inertial sensors. As described above, the angular velocity sensor 202 detecting the angular velocity $\omega 1$ and the angular velocity sensor 203 detecting the angular velocity $\omega 2$ are separately provided, and thereby, the degree of freedom of placement of these angular velocity sensors 202, 203 is higher. Accordingly, for example, the angular velocity sensor 202 is easily placed on the line L.

As described above, the robot system 1 has the robot 2 and the control apparatus 3 that controls driving of the robot 2. Accordingly, the highly reliable robot system 1 that may enjoy the effect (damping effect) of the above described robot 2 is obtained.

Second Embodiment

Figure 10:
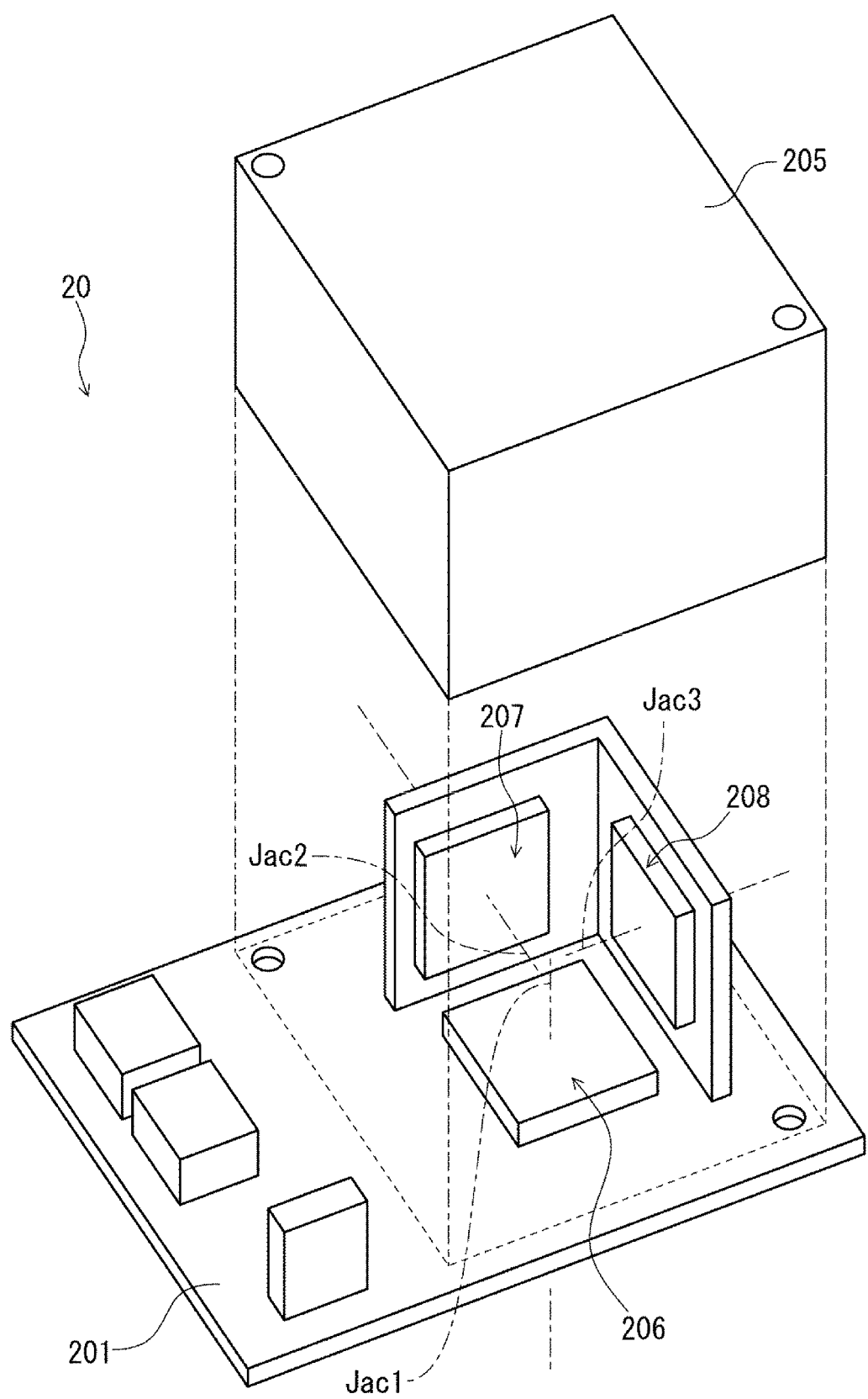
FIG. 10 is an exploded perspective view of an inertial sensor unit of a robot system according to a second embodiment of the present disclosure.
Figure 11:
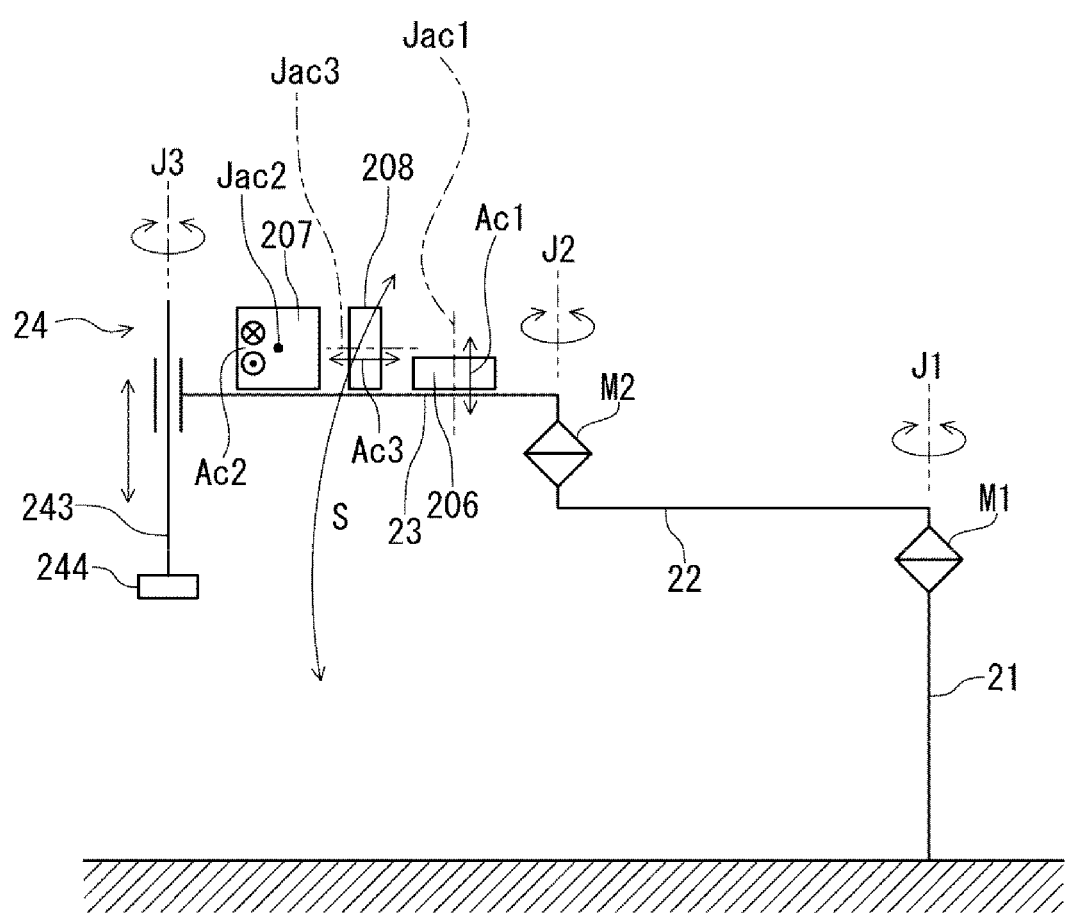
FIG. 11 is a schematic diagram of a robot.

FIG. 10 is the exploded perspective view of the inertial sensor unit of the robot system according to the second embodiment of the present disclosure. FIG. 11 is the schematic diagram of the robot.

The robot system according to the embodiment is the same as the robot system 1 of the above described first embodiment except that the configuration of the inertial sensor unit 20 is different. Note that, in the following description, the robot system of the second embodiment will be explained with a focus on the differences from the above described first embodiment and the explanation of the same items will be omitted. In FIGS. 10 and 11, the same configurations as those of the above described embodiment have the same signs.

As shown in FIG. 10, the inertial sensor unit 20 of the embodiment has three acceleration sensors 206, 207, 208 as inertial sensors, and the circuit board 201 on which the acceleration sensors 206, 207, 208 are mounted for processing signals output from the acceleration sensors 206, 207, 208. Further, the circuit board 201 has the lid member 205 covering the acceleration sensors 206, 207, 208. Detection axes of the acceleration sensors 206, 207, 208 are orthogonal to one another.

Specifically, as shown in FIG. 11, the acceleration sensor 206 (first inertial sensor) has an acceleration detection axis Jac1 parallel to the second axis J2 and detects an acceleration Ac1 along the acceleration detection axis Jac1. The acceleration sensor 207 (second inertial sensor) has an acceleration detection axis Jac2 orthogonal to a plane passing through the second axis J2 and the third axis J3, and detects an acceleration along the acceleration detection axis Jac2. The acceleration sensor 208 (second inertial sensor) has an acceleration detection axis Jac3 parallel to the line L and detects an acceleration along the acceleration detection axis Jac3.

According to the configuration, the vibration of the second arm 23 in the vertical directions may be detected by the acceleration sensor 206, and the vibration of the second arm 23 in the pivot directions may be detected by the acceleration sensors 207, 208. Accordingly, like the above described first embodiment, the vibration of the second arm 23 in the vertical directions may be reduced by feedback of a detection signal from the acceleration sensor 206 to the current command to the motor 264, and the vibration of the second arm 23 in the pivot directions may be reduced by feedback of detection signals from the acceleration sensors 207, 208 to the current commands to the motors 261, 262.

As described above, the robot 2 of the embodiment has the acceleration sensor 206 as the inertial sensor provided in the second arm 23 and detecting the acceleration in the second axis J2 direction. The acceleration sensor 206 is placed in the second arm 23, and thereby, the vibration of the second arm 23 in the vertical directions may be accurately detected. Accordingly, the detection signal from the acceleration sensor 206 is fed back to the driving of the robot 2, and thereby, the vibration of the second arm 23 in the vertical directions may be effectively suppressed.

Further, as described above, the inertial sensor detects the acceleration of the second arm 23 in the pivot direction. The acceleration of the second arm 23 in the pivot direction is fed back to the driving of the robot 2, and thereby, the vibration of the second arm 23 in the pivot directions may be effectively suppressed. Particularly, the robot 2 of the embodiment includes, as the acceleration sensors, the acceleration sensor 206 as the first inertial sensor that detects the acceleration Ac1 in the second axis J2 direction, and the acceleration sensors 207, 208 as the second inertial sensors that detect accelerations Ac2, Ac3 of the second arm in the pivot directions. As described above, the acceleration sensor 206 detecting the acceleration Ac1 and the acceleration sensors 207, 208 detecting the accelerations Ac2, Ac3 are separately provided, and thereby, the degree of freedom of placement of these acceleration sensors 206, 207, 208 is higher. Accordingly, for example, the acceleration sensor 206 is easily placed on the line L.

According to the second embodiment, the same effects as those of the above described first embodiment may be exerted.

Third Embodiment

Figure 12:
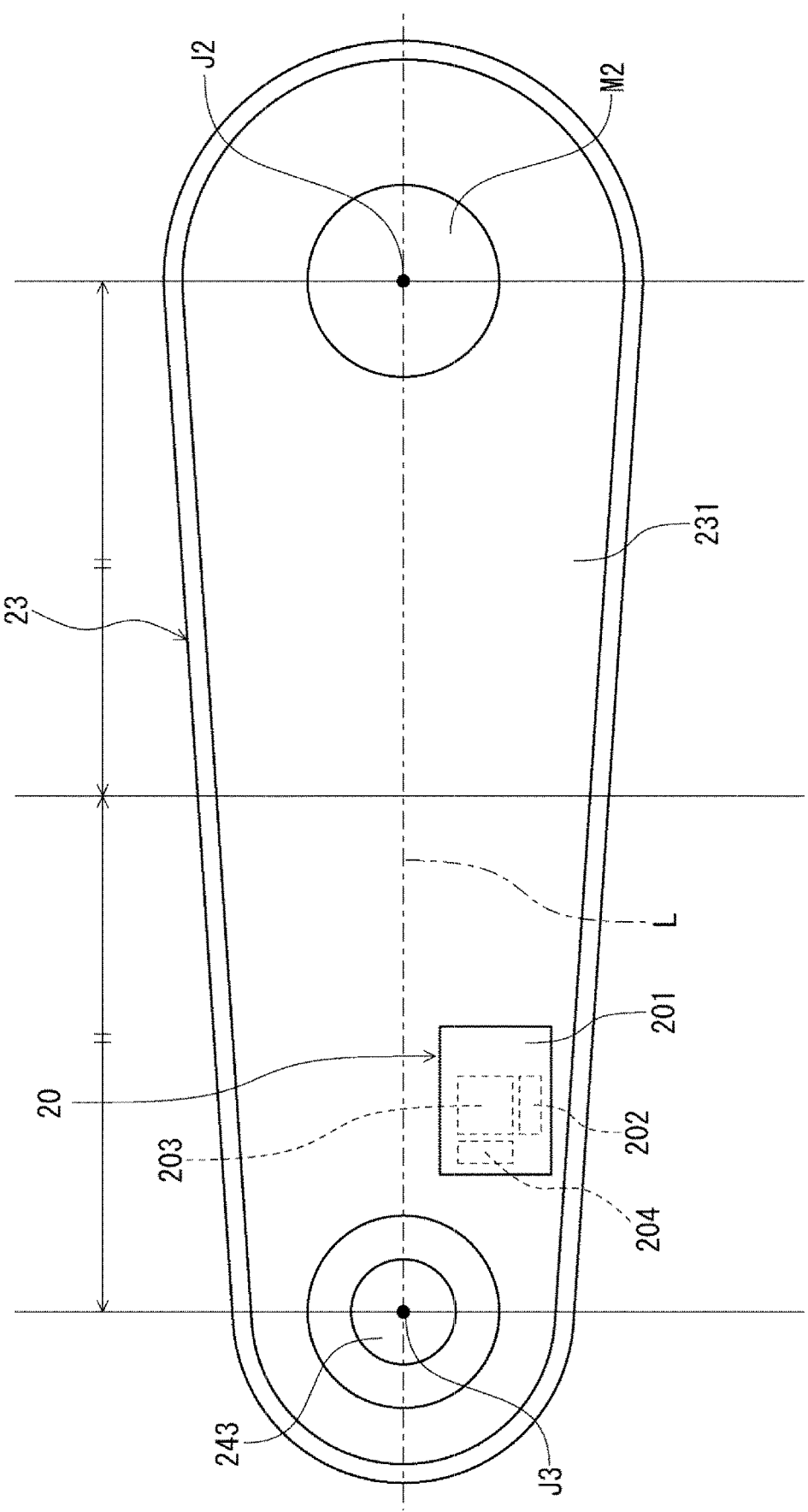
FIG. 12 is a bottom view of an arm base of a second arm of a robot system according to a third embodiment of the present disclosure.
Figure 13:
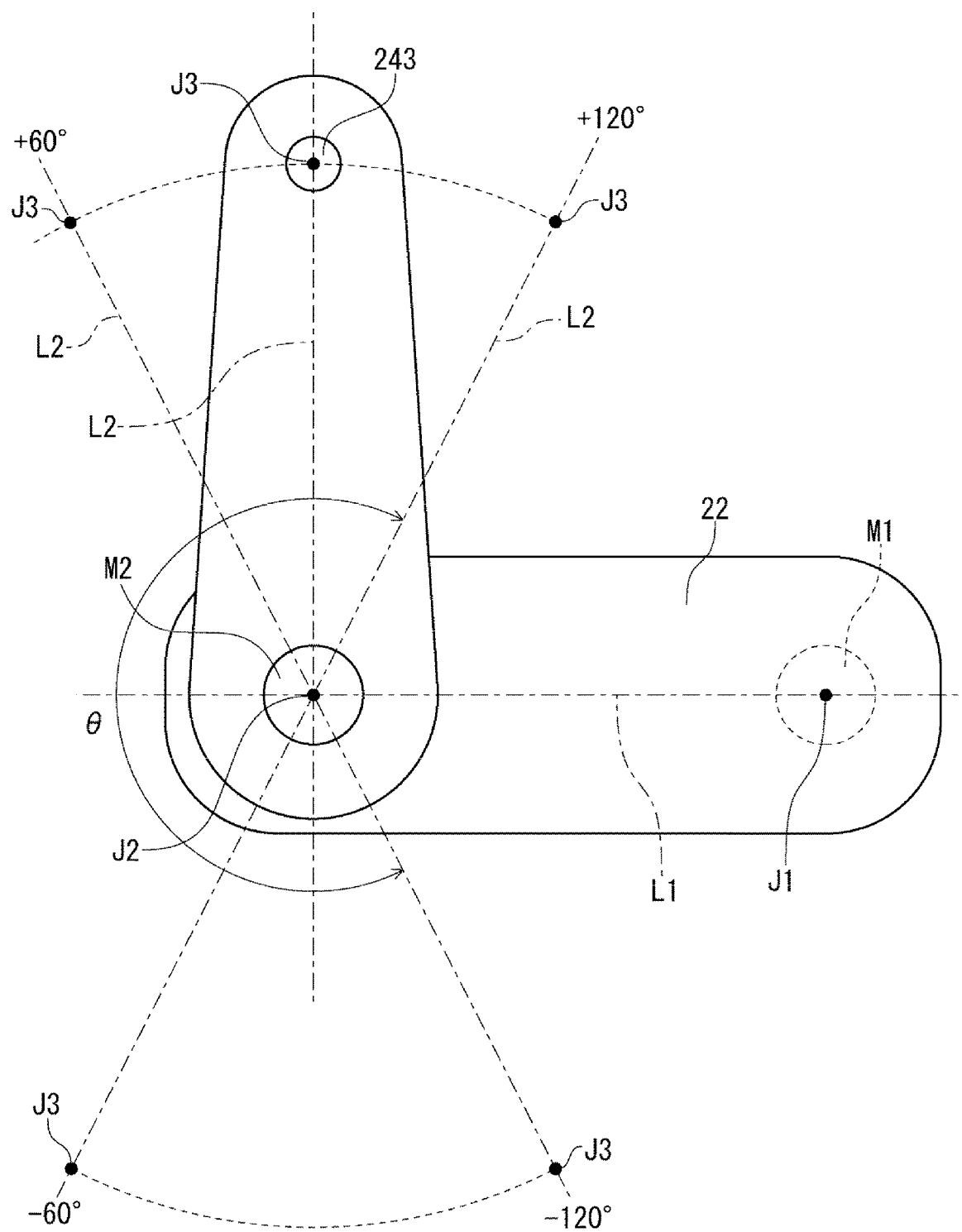
FIG. 13 is a top view showing a state in which the second arm is bent relative to the first arm.

FIG. 12 is the bottom view of the arm base of the second arm of the robot system according to the third embodiment of the present disclosure. FIG. 13 is the top view showing the state in which the second arm is bent relative to the first arm.

The robot system according to the embodiment is the same as the robot system 1 of the above described first embodiment except that the placement of the inertial sensor unit 20 is different. Note that, in the following description, the robot system of the third embodiment will be explained with a focus on the differences from the above described first embodiment and the explanation of the same items will be omitted. In FIGS. 12 and 13, the same configurations as those of the above described embodiments have the same signs.

As shown in FIG. 12, in the robot 2 of the embodiment, the angular velocity sensor 202 does not cross the plane passing through the second axis J2 and the third axis J3. Thereby, the vibration component B (i.e., the vibration of the second arm 23 in the vertical directions due to twisting of the first arm 22 and twisting of the second arm 23) together with the above described vibration component A may be detected by the angular velocity sensor 202.

For example, as shown in FIG. 13, when the second arm 23 is bent relative to the first arm 22, twisting is easily generated in the first arm 22 and the second arm 23. Accordingly, the vibration of the second arm 23 in the vertical directions due to the twisting is detected by the angular velocity sensor 202, and thereby, the vibration of the second arm 23 as a whole in the vertical directions may be detected more accurately. Note that the state in which the second arm 23 is bent relative to the first arm 22 refers to e.g. a state in which an inclination θ of the line L2 passing through the second axis J2 and the third axis J3 relative to the line L1 passing through the first axis J1 and the second axis J2 is from −120° to −60° and from +60° to +120° as shown in FIG. 13.

According to the third embodiment, the same effects as those of the above described first embodiment may be exerted.

Figure 14:
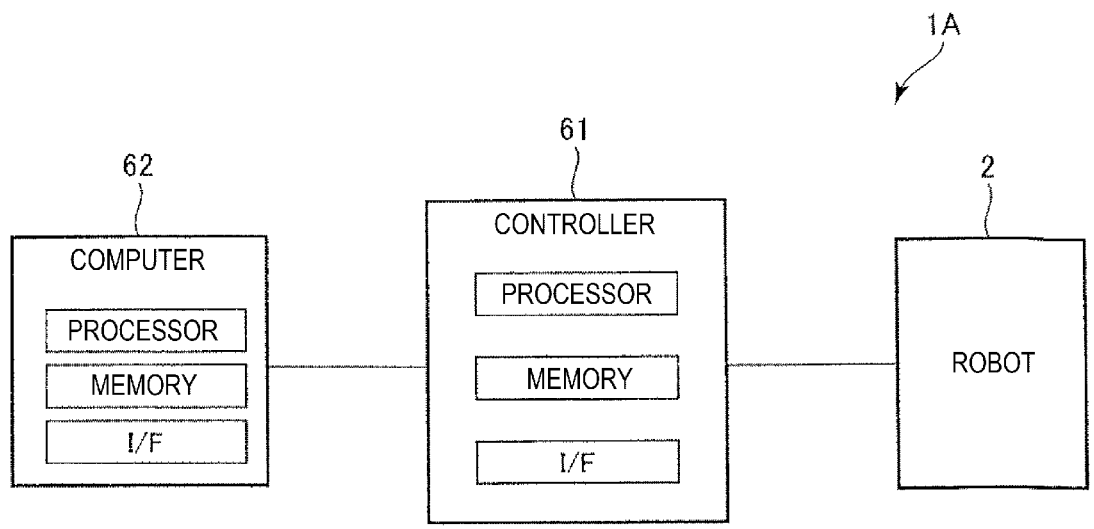
FIG. 14 is a block diagram for explanation of the first to third embodiments with a focus on hardware (processors).

FIG. 14 is the block diagram for explanation of the first to third embodiments with a focus on hardware (processors). FIG. 14 shows an overall configuration of a robot system 1A in which the robot 2, a controller 61, and a computer 62 are coupled. The control of the robot 2 may be executed by the processor in the controller 61 reading a command in a memory, or executed by a processor in the computer 62 reading a command in a memory via the controller 61. Therefore, one or both of the controller 61 and the computer 62 may be regarded as "control apparatus".

Figure 15:
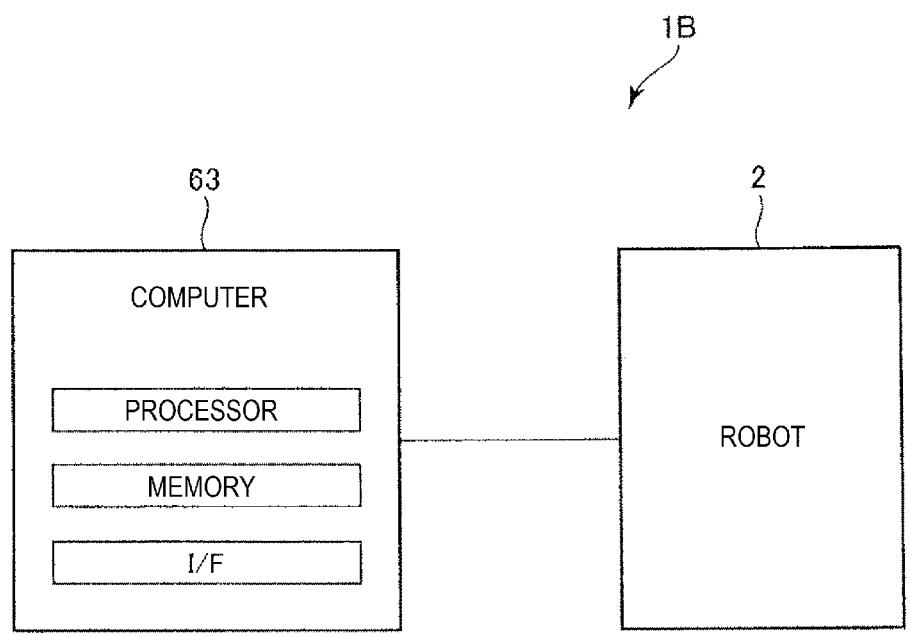
FIG. 15 is a block diagram showing another example 1 (modified example 1) of the robot system according to the present disclosure.

FIG. 15 is the block diagram showing another example 1 (modified example 1) of the robot system according to the present disclosure. FIG. 15 shows an overall configuration of a robot system 1B in which a computer 63 is directly coupled to the robot 2. The control of the robot 2 is directly executed by a processor in the computer 63 reading a command in a memory. Therefore, the computer 63 may be regarded as "control apparatus".

Figure 16:
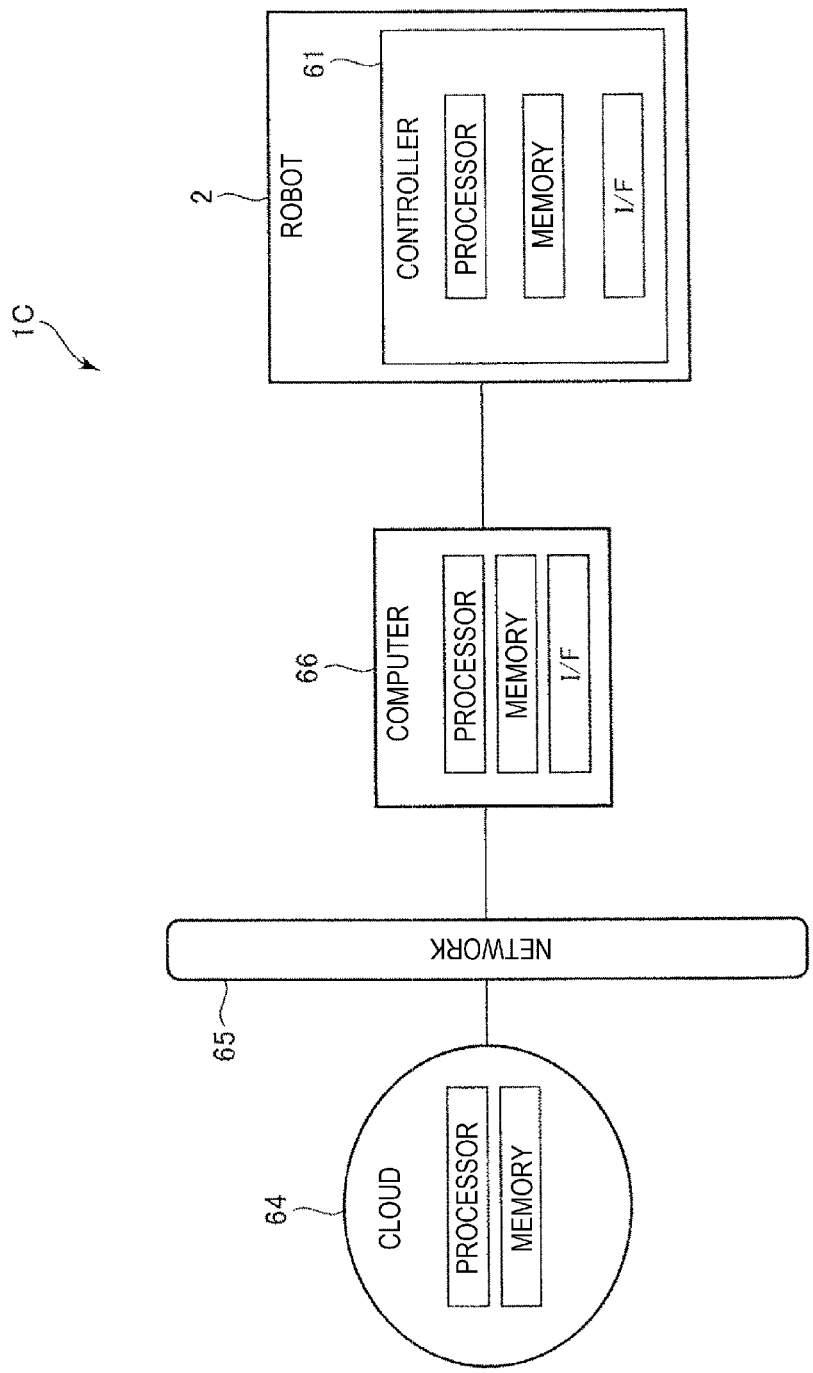
FIG. 16 is a block diagram showing another example 2 (modified example 2) of the robot system according to the present disclosure.

FIG. 16 is the block diagram showing another example 2 (modified example 2) of the robot system according to the present disclosure. FIG. 16 shows an overall configuration of a robot system 1C in which the robot 2 containing the controller 61 and a computer 66 are coupled and the computer 66 is connected to a cloud 64 via a network 65 such as LAN. The control of the robot 2 may be executed by a processor in the computer 66 reading a command in a memory, or executed by a processor on the cloud 64 reading a command in a memory via the computer 66. Therefore, one, two, or three (all) of the controller 61, the computer 66, and the cloud 64 may be regarded as "control apparatus".

As above, the robot and the robot system according to the present disclosure are explained according to the illustrated embodiments, however, the present disclosure is not limited to those and the configurations of the respective parts may be replaced by arbitrary configurations having the same functions. Further, other arbitrary configurations may be added thereto. Furthermore, the present disclosure may include a combination of two or more arbitrary configurations (features) of the above described respective embodiments.

In the above described embodiments, the location to which the base of the robot is fixed is e.g. a floor in the installation space, however, not limited to that in the present disclosure. In addition, the location includes e.g. a ceiling, wall, workbench, and the ground. Alternatively, the base itself may be movable. Alternatively, in the present disclosure, the robot may be installed within a cell. In this case, the location to which the base of the robot is fixed includes e.g. a floor part, ceiling part, wall part, and workbench of the cell.

In the above described embodiments, a first surface as a planar surface (plane) to which the robot (base) is fixed is the planar surface (plane) parallel to the horizontal plane, however, not limited to that in the present disclosure. For example, the surface may be a planar surface (plane)

inclined relative to the horizontal plane or vertical plane or a planar surface (plane) parallel to the vertical plane. That is, the first to third axes may be inclined relative to the vertical direction.

In the above described embodiments, the number of pivot axes of the robot arm is two, however, not limited to that in the present disclosure. The number of pivot axes of the robot arm may be one, three, or more. That is, in the above described embodiments, the number of arms is two, however, not limited to that in the present disclosure. The number of arms may be e.g. one, three, or more. Further, the processor may be formed by a single apparatus or a plurality of apparatuses, that is, may be divided in a plurality of unit processors.

What is claimed is:

1. A robot comprising:
   three axes orthogonal to each other being defined as an X axis, a Y axis, and a Z axis;
   a base;
   a first arm provided at the base and pivoting about a first axis relative to the base, the first axis being along the Z axis;
   a second arm provided at the first arm and pivoting about a second axis parallel to the first axis relative to the first arm;
   an inertial sensor component provided in the second arm, the inertial sensor component including:
      a first sensor configured to detect an angular velocity about the X axis;
      a second sensor configured to detect an angular velocity about the Z axis: and
      a third sensor configured to detect an angular velocity about the Y axis;
   a pipe located outside of the first arm and coupling the base and the second arm;
   a wire placed through the pipe and electrically coupled to the inertial sensor component;
   a shaft provided in the second arm and pivoting about a third axis parallel to the second axis; and
   a circuit board that mounts the inertial sensor component and processes a signal output from the inertial sensor component, wherein
   the circuit board intersects a virtual plane on which the second axis and the third axis are located.

2. The robot according to claim 1, wherein the circuit board is directly fixed to an arm base of the second arm.

3. The robot according to claim 1, wherein the first sensor intersects the virtual plane on which the second axis and the third axis are located.

4. The robot according to claim 1, wherein
   the inertial sensor component does not intersect the virtual plane on which the second axis and the third axis are located.

5. The robot according to claim 1, wherein the inertial sensor component is supported by an arm base of the second arm at a downside of the arm base and provided closer to the third axis than the second axis.

6. A robot system comprising:
   three axes orthogonal to each other being defined as an X axis, a Y axis, and a Z axis;
   a robot; and
   a control apparatus that controls driving of the robot, wherein the robot includes:
   a base;
   a first arm provided at the base and pivoting about a first axis relative to the base, the first axis being along the Z axis;
   a second arm provided at the first arm and pivoting about a second axis parallel to the first axis relative to the first arm;
   an inertial sensor component provided in the second arm, the inertial sensor component including:
      a first sensor configured to detect an angular velocity about the X axis;
      a second sensor configured to detect an angular velocity about the Z axis; and
      a third sensor configured to detect an angular velocity about the Y axis:
   a pipe located outside of the first arm and coupling the base and the second arm;
   a wire placed through the pipe and electrically coupled to the inertial sensor component;
   a shaft provided in the second arm and pivoting about a third axis parallel to the second axis; and
   a circuit board that mounts the inertial sensor component and processes a signal output from the inertial sensor component, wherein
   the circuit board intersects a virtual plane on which the second axis and the third axis are located.

7. The robot according to claim 3, wherein
   the second sensor is on a first linear line passing through the first sensor, and the first linear line is parallel to the X axis,
   the third sensor is on a second linear line passing through the second sensor, and the second linear line is parallel to the Y axis, and
   the third sensor is provided closer to the third axis than the second sensor.

8. The robot according to claim 5, wherein
   the second arm has a lower cover, and
   the lower cover is placed on the downside of the arm base of the second arm to cover the inertial sensor component.

* * * * *